United States Patent
Kura

(10) Patent No.: US 10,015,652 B2
(45) Date of Patent: Jul. 3, 2018

(54) NEAR-FIELD WIRELESS COMMUNICATION EQUIPMENT, AND NEAR-FIELD WIRELESS COMMUNICATION METHOD

(71) Applicant: NEC Platforms, Ltd., Kawasaki-shi, Kanagawa (JP)

(72) Inventor: Noriyuki Kura, Kanagawa (JP)

(73) Assignee: NEC Platforms, Ltd., Kawasaki-shi, Kanagawa (JP)

(*) Notice: Subject to any disclaimer, the term of this patent is extended or adjusted under 35 U.S.C. 154(b) by 0 days.

(21) Appl. No.: 15/307,425

(22) PCT Filed: Mar. 8, 2016

(86) PCT No.: PCT/JP2016/001261
§ 371 (c)(1),
(2) Date: Oct. 28, 2016

(87) PCT Pub. No.: WO2016/163067
PCT Pub. Date: Oct. 13, 2016

(65) Prior Publication Data
US 2017/0048657 A1    Feb. 16, 2017

(30) Foreign Application Priority Data
Apr. 9, 2015    (JP) ................. 2015-080153

(51) Int. Cl.
*H04W 4/80*    (2018.01)
*H04L 29/06*    (2006.01)
(Continued)

(52) U.S. Cl.
CPC .............. *H04W 4/80* (2018.02); *H04B 5/00* (2013.01); *H04L 29/06* (2013.01); *H04L 69/08* (2013.01);
(Continued)

(58) Field of Classification Search
CPC ................................................ H04W 4/008
See application file for complete search history.

(56) References Cited

U.S. PATENT DOCUMENTS 9,014,751 B1 *    4/2015    Choi ................. H04W 52/38
                                                                    455/454
2004/0049737 A1 *    3/2004    Simon Hunt ..... G06F 17/30905
                                                                    715/238
(Continued)

FOREIGN PATENT DOCUMENTS

CN        101114846 A        1/2008
CN        103580844 A        2/2014
(Continued)

OTHER PUBLICATIONS

Japanese Office Action of Application No. 2015-080153 dated Mar. 15, 2016.
(Continued)

Primary Examiner — Hsin-Chun Liao
(74) Attorney, Agent, or Firm — Sughrue Mion, PLLC

(57) ABSTRACT

A wireless communication equipment capable of securing the reliability and validity of transmission data, for example, a near-field wireless communication equipment compliant with Bluetooth, is provided. A near-field wireless communication equipment (10) compliant with Bluetooth alternately repeats an alternate monitoring operation when a master-side counter information equipment (20) is located close to the near-field wireless communication equipment (10) and data communication between them is made possible, the alternate monitoring operation being reception of transmission data to which an A2DP profile is applied from the master-side counter information equipment (20) as a DTMF signal and then transmission of an ACK signal or a NAK signal back to the master-side counter information equipment (20) as response data indicating a result of (Continued)

analyzing the transmission data using an AVRCP profile or transmission of transmission data to which the A2DP profile is applied to the master-side counter information equipment (20) and then reception of response data indicating a result of analyzing the transmission data from the master-side counter information equipment (20) using the AVRCP profile.

5 Claims, 5 Drawing Sheets

(51) Int. Cl.
  *H04W 4/00* (2018.01)
  *H04B 5/00* (2006.01)
  *H04W 84/18* (2009.01)
  *H04L 1/08* (2006.01)
  *H04L 1/12* (2006.01)

(52) U.S. Cl.
  CPC ............. *H04L 69/18* (2013.01); *H04W 4/008* (2013.01); *H04L 1/08* (2013.01); *H04L 2001/125* (2013.01); *H04W 84/18* (2013.01)

(56) References Cited

U.S. PATENT DOCUMENTS

| | | | |
|---|---|---|---|
| 2011/0228862 A1* | 9/2011 | Yamashita | H04L 69/14 375/259 |
| 2014/0134949 A1* | 5/2014 | Sakata | H04W 4/008 455/41.2 |

FOREIGN PATENT DOCUMENTS

| | | |
|---|---|---|
| CN | 103825905 A | 5/2014 |
| JP | 2007-214746 A | 8/2007 |
| JP | 2010-4485 A | 1/2010 |
| JP | 4881454 B2 | 2/2012 |
| JP | 2014-163879 A | 9/2014 |
| JP | 5657771 B1 | 1/2015 |

OTHER PUBLICATIONS

International Search Report of PCT/JP2016/001261 dated Apr. 12, 2016.

* cited by examiner

| 4bit | 4bit | 4bit | 4bit |
|---|---|---|---|
| SEQUENCE NUMBER | DATA LENGTH | DATA | DATA |
| DATA | .... | CHECK SUM (HIGH-ORDER) | CHECK SUM (LOW-ORDER) |

A

| 1h | 4h | Ah | 6h |
|---|---|---|---|
| Bh | 4h | 2h | 4h |

B

NEAR-FIELD WIRELESS COMMUNICATION EQUIPMENT, AND NEAR-FIELD WIRELESS COMMUNICATION METHOD

CROSS REFERENCE TO RELATED APPLICATIONS

This application is a National Stage of International Application No. PCT/JP2016/001261 filed Mar. 8, 2016, claiming priority based on Japanese Patent Application No. 2015-080153, filed Apr. 9, 2015, the contents of which are incorporated herein by reference in their entirety.

TECHNICAL FIELD

The present invention relates to a wireless communication equipment, a near-field wireless communication equipment, a wireless communication method, and a near-field wireless communication method.

BACKGROUND ART

A near-field wireless communication equipment to which Bluetooth (registered trademark) technology, which is one representative example of near-field wireless communication technologies, has been applied, includes, for example, an acoustic equipment such as a headset, earphones, and a speaker and a portable music player (including a mobile telephone or the like) that transmits music to be played to the acoustic equipment, or an operation equipment such as a wireless remote controller and equipment such as a TV, a music player, or a mobile terminal, which is a counter equipment operated by the operation equipment.

As disclosed in Patent Literature 1 (Japanese Unexamined Patent Application Publication No. 2010-4485, titled "Remote Control Method, Apparatus, and Remote Control System") etc., an Advanced Audio Distribution Profile (A2DP profile) for streaming acoustic data of stereo sound quality is typically used as a near-field wireless communication profile (protocol) for acoustic equipment and an Audio/Video Remote Control Profile (AVRCP profile) for remotely operating the counter equipment is typically used as the near-field wireless communication profile (protocol) for the wireless remote controller.

Even in the near-field wireless communication equipment loaded with these typical profiles (protocols) for the near-field wireless communication, it is normally impossible to perform data communication between the near-field wireless communication equipment (e.g., headset having a sound reproduction function and a remote control function) and the counter information equipment (e.g., mobile information terminal such as a mobile telephone or a tablet terminal) on Bluetooth. However, when another information equipment performs (counter information equipment) an initial setting or changes settings of functions included in the headset, for example, it is required to perform data communication between the headset and the other information equipment (counter information equipment). In order to perform this data communication on Bluetooth, a profile dedicated for the data communication such as a Serial Port Profile (SPP) to connect a personal computer (PC) in which a virtual serial port is set or a Personal Area Networking (PAN) profile that performs wireless connection between a master PC and a slave PC, which requires profiles such as a Serial Port Profile/Personal Area Networking Profile (SPP/PAN) for the data communication to be newly installed in the near-field wireless communication equipment, is.

CITATION LIST

Patent Literature

[Patent Literature 1] Japanese Unexamined Patent Application Publication No. 2010-4485 (pp. 3-4)

SUMMARY OF INVENTION

Technical Problem

As described above, even when the typical near-field wireless communication profiles (protocols) such as the A2DP and the AVRCP are included in the typical near-field wireless communication equipment (e.g., headset having a sound reproduction function and a remote control function) including an acoustic function, a video function, a mobile information function or the like as typical Bluetooth profiles, in order to perform data communication, even a simple data communication, profiles such as the SPP/PAN need to be additionally installed, which causes the production cost to be inevitably increased.

Further, the Bluetooth profiles dedicated for the data communication such as the SPP/PAN are not installed in all the equipment including the mobile information terminal such as a TV, a music player, a mobile telephone, and a tablet terminal that are compliant with Bluetooth and a coverage rate with respect to commercially available products that are equipped with the near-field wireless communication function is not sufficiently high. Therefore, even for a simple data communication, almost all of the existing Bluetooth-enabled equipment needs to be modified.

Accordingly, it is desired, in the typical near-field wireless communication equipment, to achieve a simple data communication method that uses the typical profiles (A2DP/AVRCP) that have already been typically installed. In the current Bluetooth communication, however, when data communication is performed using the A2DP/AVRCP profiles, the data communication is performed only in one direction: from the master equipment to the slave equipment or from the slave equipment to the master equipment. In the data communication performed between existing equipment, there is a problem regarding the reliability of transmission data, and it is thus difficult to secure the validity of the communication.

Objects of Present Invention

The present invention has been made in view of the aforementioned circumstances and aims to provide a wireless communication equipment, a near-field wireless communication equipment, a wireless communication method, and a near-field wireless communication method capable of securing the reliability and validity of transmission data.

Solution to Problem

In order to solve the aforementioned problem, the wireless communication equipment, the near-field wireless communication equipment, the wireless communication method, and the near-field wireless communication method mainly employ the following characteristic configurations.

(1) A wireless communication equipment according to the present invention is a wireless communication equipment including a plurality of communication means, the wireless communication equipment performing, when data communication with a counter information equipment is made possible, one of operations of alternately repeating reception of transmission data from the counter information equipment and then transmission of response data indicating a result of analyzing the transmission data that has been received to the counter information equipment using communication means different from communication means that has been applied to the reception of the transmission data and alternately repeating transmission of transmission data to the counter information equipment and then reception of response data indicating a result of analyzing the transmission data from the counter information equipment using communication means different from communication means that has been applied to the transmission of the transmission data.

(2) A wireless communication equipment according to the present invention is a wireless communication equipment loaded with a plurality of protocols for performing a wireless communication, the wireless communication equipment performing, when data communication with a counter information equipment is made possible, one of operations of alternately repeating reception of transmission data from the counter information equipment and then transmission of response data indicating a result of analyzing the transmission data that has been received to the counter information equipment using a protocol different from a protocol that has been applied to the reception of the transmission data and alternately repeating transmission of transmission data to the counter information equipment and then reception of response data indicating a result of analyzing the transmission data from the counter information equipment using a protocol different from a protocol that has been applied to the transmission of the transmission data.

(3) A near-field wireless communication equipment according to the present invention is a near-field wireless communication equipment loaded with a plurality of protocols for performing a near-field wireless communication, the near-field wireless communication equipment performing, when data communication with a counter information equipment is made possible, one of operations of alternately repeating reception of transmission data from the counter information equipment and then transmission of response data indicating a result of analyzing the transmission data that has been received to the counter information equipment using a protocol different from a protocol that has been applied to the reception of the transmission data and alternately repeating transmission of transmission data to the counter information equipment and then reception of response data indicating a result of analyzing the transmission data from the counter information equipment using a protocol different from a protocol that has been applied to the transmission of the transmission data.

(4) A near-field wireless communication equipment according to the present invention is a near-field wireless communication equipment loaded with a plurality of profiles of a Bluetooth near-field wireless communication system, the near-field wireless communication equipment performing, when data communication with a counter information equipment is made possible, one of operations of alternately repeating reception of transmission data from the counter information equipment and then transmission of response data indicating a result of analyzing the transmission data that has been received to the counter information equipment using a profile different from a profile that has been applied to the reception of the transmission data and alternately repeating transmission of transmission data to the counter information equipment and then reception of response data indicating a result of analyzing the transmission data from the counter information equipment using a profile different from a profile that has been applied to the transmission of the transmission data.

(5) A wireless communication method according to the present invention is a wireless communication method using a plurality of communication means, the wireless communication method performing, when data communication with a counter information equipment is made possible, one of operations of alternately repeating reception of transmission data from the counter information equipment and then transmission of response data indicating a result of analyzing the transmission data that has been received to the counter information equipment using communication means different from communication means that has been applied to the reception of the transmission data and alternately repeating transmission of transmission data to the counter information equipment and then reception of response data indicating a result of analyzing the transmission data from the counter information equipment using communication means different from communication means that has been applied to the transmission of the transmission data.

(6) A wireless communication method according to the present invention is a wireless communication method using a plurality of protocols for performing a wireless communication, the wireless communication method performing, when data communication with a counter information equipment is made possible, one of operations of alternately repeating reception of transmission data from the counter information equipment and then transmission of response data indicating a result of analyzing the transmission data that has been received to the counter information equipment using a protocol different from a protocol that has been applied to the reception of the transmission data and alternately repeating transmission of transmission data to the counter information equipment and then reception of response data indicating a result of analyzing the transmission data from the counter information equipment using a protocol different from a protocol that has been applied to the transmission of the transmission data.

(7) A near-field wireless communication method according to the present invention is a near-field wireless communication method using a plurality of protocols for performing a near-field wireless communication, the near-field wireless communication method performing, when data communication with a counter information equipment is made possible, one of operations of alternately repeating reception of transmission data from the counter information equipment and then transmission of response data indicating a result of analyzing the transmission data that has been received to the counter information equipment using a protocol different from a protocol that has been applied to the reception of the transmission data and alternately repeating transmission of transmission data to the counter information equipment and then reception of response data indicating a result of analyzing the transmission data from the counter information equipment using a protocol different from a protocol that has been applied to the transmission of the transmission data.

(8) A near-field wireless communication method according to the present invention is a near-field wireless communication method using a plurality of profiles of a Bluetooth near-field wireless communication system, the near-field wireless communication method performing, when data communication with a counter information equipment is made possible, one of operations of alternately repeating reception of transmission data from the counter information equipment and then transmission of response data indicating a result of analyzing the transmission data that has been received to the counter information equipment using a profile different from a profile that has been applied to the reception of the transmission data and alternately repeating transmission of transmission data to the counter information equipment and then reception of response data indicating a result of analyzing the transmission data from the counter information equipment using a profile different from a profile that has been applied to the transmission of the transmission data.

Advantageous Effects of Invention

According to the wireless communication equipment, the near-field wireless communication equipment, the wireless communication method, and the near-field wireless communication method of the present invention, the following effects can be obtained.

According to the present invention, when the master-side counter information equipment is located close to the slave-side near-field wireless communication equipment loaded with a plurality of profiles of the Bluetooth near-field wireless communication system, for example, and the mutual data communication between them is made possible, the operation of transmitting the transmission data in the downlink from the master-side counter information equipment to the slave-side near-field wireless communication equipment or the uplink from the slave-side near-field wireless communication equipment to the master-side counter information equipment, and the operation of sending back, using a profile different from a profile applied to the transmission data, the response data indicating the result of analyzing the transmission data in the uplink from the slave-side near-field wireless communication equipment to the master-side counter information equipment or the downlink from the master-side counter information equipment to the slave-side near-field wireless communication equipment are alternately repeated. Accordingly, the master-side counter information equipment and the slave-side near-field wireless communication equipment are able to mutually monitor the transmission/reception data each other, whereby it is possible to definitely secure the reliability and the validity of the data to be transmitted and received in both the near-field wireless communication equipment and the counter information equipment.

DESCRIPTION OF EMBODIMENTS

Figure 1:
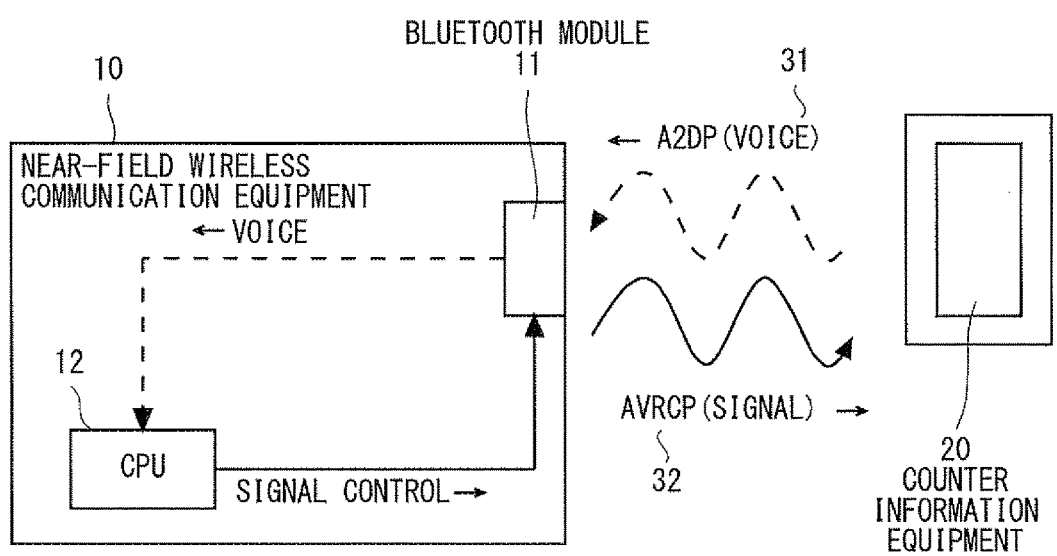
FIG. 1 is a block configuration diagram showing one configuration example of a near-field wireless communication equipment according to the present invention.

Hereinafter, with reference to the drawings, a preferred embodiment of a wireless communication equipment, a near-field wireless communication equipment, a wireless communication method, and a near-field wireless communication method according to the present invention will be described. In the following description, a near-field wireless communication equipment loaded with a plurality of profiles of a Bluetooth near-field wireless communication system will be described as one example of the near-field wireless communication equipment according to the present invention. However, a near-field wireless communication equipment loaded with a plurality of protocols for near-field wireless communication in a Near Field Communication (NFC) system or a Radio Frequency Identification (RFID) system or the like may also be applied in a way similar to the way the near-field wireless communication equipment of the Bluetooth near-field wireless communication system is applied by using the plurality of protocols for near-field wireless communication in place of the plurality of profiles of the Bluetooth near-field wireless communication system. Furthermore, it is also needless to say that a wireless communication equipment that includes a plurality of communication means for wireless communication such as wireless Local Area Network (LAN), Wireless Fidelity (Wi-Fi), public wireless LAN, Worldwide Interoperability for Microwave Access (WiMAX), or Long Term Evolution (LTE), or a wireless communication equipment loaded with a plurality of protocols for wireless communication such as a File Transfer Protocol (FTP), a Hyper-Text Transport Protocol (HTTP), a Message Queuing Telemetry Transport (MQTT), or a Constrained Application Protocol (CoAP) may also be applied in a way similar to the way the near-field wireless communication equipment of the Bluetooth near-field wireless communication system is applied by using the plurality of communication means and the plurality of protocols in place of the plurality of profiles of the Bluetooth near-field wireless communication system. Further, reference symbols in the drawing are appended to respective elements for convenience to facilitate understanding, and are not intended to limit the present invention to the mode(s) as illustrated.

Features of Present Invention

Prior to giving the description of an embodiment of the present invention, an outline of features of the present invention will be described. The main feature of the present invention is that it performs data communication using, for example, different profiles for an uplink and a downlink of a Bluetooth near-field wireless communication, whereby the reliability and validity of the communication can be secured. More specifically, by using A2DP/AVRCP profiles of Bluetooth communication installed in most information equipment such as mobile telephones or tablet terminals as near-field wireless communication means as profiles for mutually monitoring data communication, it is possible not only to perform data communication with high reliability but also to dramatically improve the coverage rate indicating the range in which the equipment can be applied. Further, since the A2DP profile is a typical profile for music reproduction, the A2DP profile is installed in a typical acoustic equipment and thus can be provided for a low cost.

As will be described below, by using different profiles (communication means) for the uplink and the downlink in the communication between equipment A (e.g., a headset having a sound reproduction function and a remote control function) of the near-field wireless communication equipment loaded with the A2DP/AVRCP profiles of the Bluetooth communication and equipment B (e.g., mobile information terminal) of the counter information equipment, bidirectional data communication (e.g., data communication for performing initial setting or changing settings, which is one of functions of the headset, by the mobile information terminal), for example, can be performed.

In the following description, with reference to the embodiment of the present invention, the present invention will be described in further detail. In this embodiment, the downlink and the uplink in the bidirectional data communication will be specifically described with reference to the following examples.

1) Downlink (equipment A (e.g., headset)←counter equipment B (e.g., mobile information terminal))
: Data is transmitted using a Dial Tone Multiplexed Frequency (DTMF) signal (1~9, 0, *, #, A, B, C, D), which is a voice band signal, by using the A2DP profile.

2) Uplink (equipment A (e.g., headset)→counter equipment B (e.g., mobile information terminal))
: Response data such as ACK (Acknowledgement: acknowledgement response), NAK (Negative Acknowledgement: negative acknowledgement response) is transmitted by using the AVRCP profile.

Configuration Example of Embodiment

Next, with reference to the drawings, one embodiment of a near-field wireless communication equipment according to the present invention will be described in detail. FIG. 1 is a block configuration diagram showing one configuration example of the near-field wireless communication equipment according to the present invention.

A near-field wireless communication equipment 10 shown in FIG. 1 includes a Bluetooth module 11 that holds A2DP/AVRCP profiles and a Central Processing Unit (CPU) 12 and the Bluetooth module 11 and the CPU 12 are directly connected to each other. The Bluetooth module 11 implements typical A2DP/AVRCP profiles and can now be easily acquired commercially as a general-purpose product. The near-field wireless communication equipment 10 is, for example, a headset that has a sound reproduction function and a remote control function.

When a counter information equipment 20 such as a mobile telephone or a tablet terminal capable of performing Bluetooth communication using the A2DP/AVRCP profiles is located near the Bluetooth module 11, the Bluetooth module 11 is able to perform data communication using the A2DP/AVRCP profiles using the counter information equipment 20 as a master. The counter information equipment 20 is, for example, a mobile information terminal such as a mobile telephone or a tablet terminal.

That is, a data signal using a Dial Tone Multiplexed Frequency (DTMF) signal (1~9, 0, *, #, A, B, C, D) or a modem signal, which are both voice band signals, is transmitted in the downlink from the master-side counter information equipment 20 to the slave-side near-field wireless communication equipment 10 by using an A2DP profile 31, as shown by the dashed line in FIG. 1, and the Bluetooth module 11 receives the data signal from the counter information equipment 20 using the A2DP profile.

Further, the Bluetooth module 11 transmits response data such as ACK (Acknowledgement: acknowledgement response) or NAK (Negative Acknowledgement: negative acknowledgement response) or a control signal to control the operation of the counter information equipment 20 in the uplink from the slave-side near-field wireless communication equipment 10 to the master-side counter information equipment 20 using an AVRCP profile 32 as shown by the solid line in FIG. 1.

The CPU 12 receives, from the Bluetooth module 11 that is directly connected to the CPU 12, a data signal composed of the voice band signal received from the master-side counter information equipment, analyzes and digitizes the data signal, generates a response signal (ACK, NAK) of the Bluetooth module 11 as a response based on the result of the analysis, generates a control signal to control the counter information equipment 20 (e.g., when the counter information equipment 20 is acoustic equipment, a command to fast-forward, rewind, reproduce, or stop music), and sends the signal that has been generated to the Bluetooth module 11.

Description of Operational Example of Embodiment

Next, one example of operations of the near-field wireless communication equipment 10 shown in FIG. 1 will be described in detail. As stated above, the CPU 12 of the slave-side near-field wireless communication equipment 10 is able to analyze and digitize the data signal composed of the voice band signal received from the master-side counter information equipment 20 via the Bluetooth module 11 and is able to directly control the Bluetooth module 11 to transmit two or more commands of the AVRCP profile to the master-side counter information equipment 20 as the control signal using the Bluetooth communication.

Figure 2:
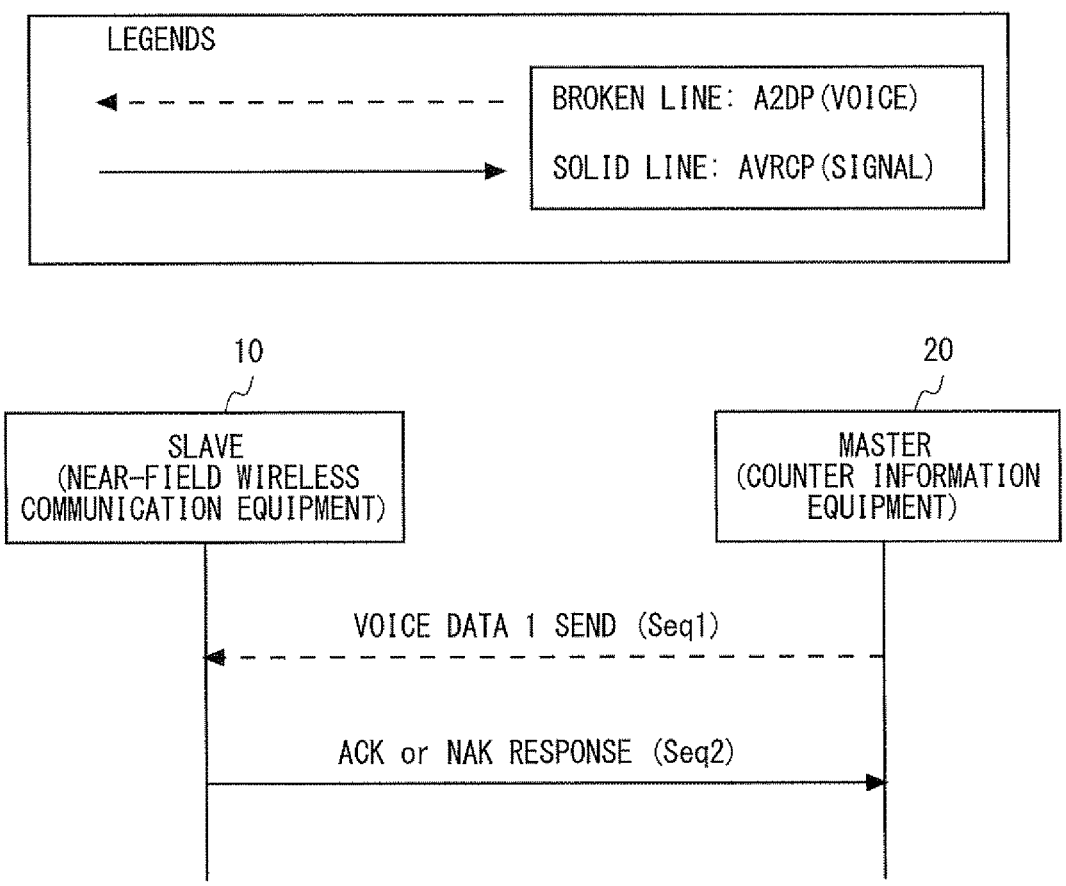
FIG. 2 is a sequence diagram showing one example of a signal transmission/reception sequence between a slave-side near-field wireless communication equipment and a master-side counter information equipment shown in FIG. 1.

FIG. 2 is a sequence diagram showing one example of a signal transmission/reception sequence between the slave-side near-field wireless communication equipment 10 and the master-side counter information equipment 20 shown in FIG. 1 and shows basic communication of control signals as a basic control method. As shown in the legends (in the frame in the upper part of FIG. 2) of the sequence diagram of FIG. 2, the signal shown by a dashed line indicates the data signal (voice data signal) by the voice band signal (DTMF signal or the like) that uses the A2DP profile and the signal shown by a solid line indicates the control signal (command signal) that uses the AVRCP profile.

In FIG. 2, as a response signal in response to the voice data signal received from the master-side counter information equipment 20, one signal is allocated as an ACK signal and another signal is allocated as a NAK signal using the command signal that uses the AVRCP profile. That is, the sequence diagram shown in FIG. 2 shows a case in which data is transmitted and received while performing a mutual check as the alternate monitoring operation of the transmission data signal and the response signal by notifying the master-side counter information equipment 20 of the validity of the data transmitted from the master-side counter information equipment 20 by the response signal sent back from the slave-side near-field wireless communication equipment 10.

Figure 3:
FIG. 3 is a table showing one example of numerical data transmitted by the master-side counter information equipment shown in FIG. 1 as a voice data 1 signal.

In the sequence diagram shown in FIG. 2, the master-side counter information equipment 20 first transmits the voice data 1 signal composed of the DTMF signal to the slave-side near-field wireless communication equipment 10 using the A2DP profile (sequence Seq1). This voice data 1 signal is obtained by converting, for example, numerical data shown in FIG. 3 into a voice band signal composed of the DTMF signal. FIG. 3 is a table showing one example of the numerical data transmitted from the master-side counter information equipment 20 shown in FIG. 1 as the voice data 1 signal. FIG. 3A is a table for describing a configuration of the numerical data and FIG. 3B is a table showing one example of the numerical data.

As shown in FIG. 3A, the numerical data has a data configuration having an existing packet format including a sequence number, a data length, and a check sum. The numerical data is composed of variable length data divided into the units of four bits (octets) and the first octet at the top sets the sequence number, the following second octet sets the data length, the third and subsequent octets set variable length data, and the last two octets set the check sum (high-order) and the check sum (low-order). Four bits of the lower eight bits of the total of the numerical data except for the check sum are allocated, for example, to the check sum (high-order) and the check sum (low-order, respectively).

The numerical data shown in FIG. 3B is shown, for example, in hexadecimal. FIG. 3B shows a case in which the sequence number at the first octet at the top is [1], the data length at the next second octet is [4], four octets from the following third to sixth octets are [A6B4], which indicates the data that should be transmitted, and the check sum (high-order) and the check sum (low-order) at the last seventh and eighth octets are [2] and [4], and the numerical data that should be transmitted by the master-side counter information equipment 20 as the voice data 1 signal is packets of eight octets [1, 4, A, 6, B, 4, 2, 4].

The DTMF signal transmitted by the master-side counter information equipment 20 as the voice data 1 signal is, as stated above, a signal expressed by four bits and the master-side counter information equipment 20 converts the numerical data that has been divided into the units of four bits as shown in FIG. 3B into a DTMF signal in order by the units of four bits from the top and continuously transmits the DTMF signal as the voice data 1 signal.

Referring back to the sequence diagram shown in FIG. 2, when the CPU 12 of the slave-side near-field wireless communication equipment 10 receives the voice data 1 signal composed of the DTMF signal transmitted from the master-side counter information equipment 20 via the Bluetooth module 11, the CPU 12 successively analyzes the voice data 1 signal and converts the voice data 1 signal into the original numerical data. After that, the CPU 12 checks whether the numerical data after the conversion satisfies the protocol to be used (in the example shown in FIG. 3B, checks whether the result of the check by the check sum is correct). When the numerical data satisfies the protocol to be used, the CPU 12 generates an ACK response indicating that it has received the normal data and sends back the ACK response to the master-side counter information equipment 20 via the Bluetooth module 11 using the AVRCP profile (sequence Seq2).

Figure 4:
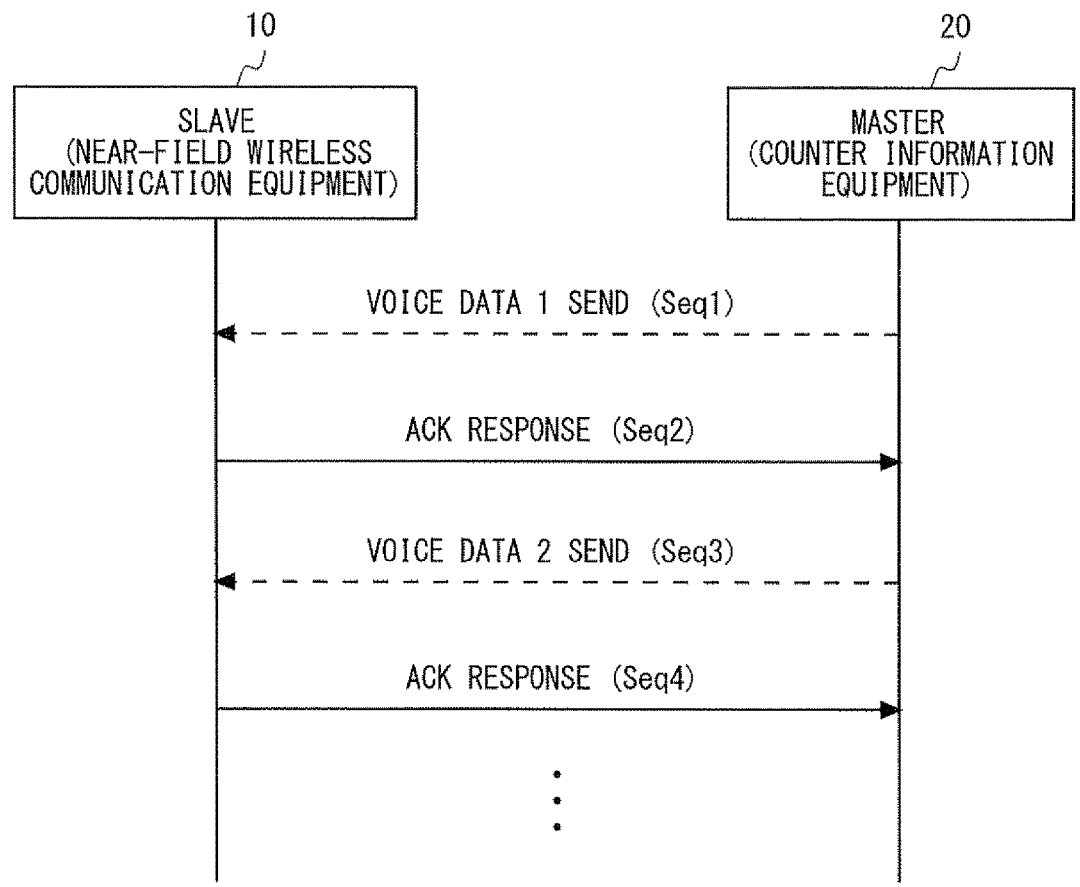
FIG. 4 is a sequence diagram showing one example of a signal sequence when a normal voice data 1 signal is transmitted or received between the slave-side near-field wireless communication equipment and the master-side counter information equipment shown in FIG. 1.

As a result, the validity of the data communication between the master-side counter information equipment 20 and the slave-side near-field wireless communication equipment 10 is established. Therefore, the master-side counter information equipment 20 is ready to transmit, as shown in FIG. 4, the next piece of data (voice data signal composed of the DTMF signal) as a voice data 2 signal (sequence Seq3). FIG. 4 is a sequence diagram showing one example of the signal sequence when the voice data 1 signal has been normally transmitted and received between the slave-side near-field wireless communication equipment 10 and the master-side counter information equipment 20 shown in FIG. 1.

Figure 5:
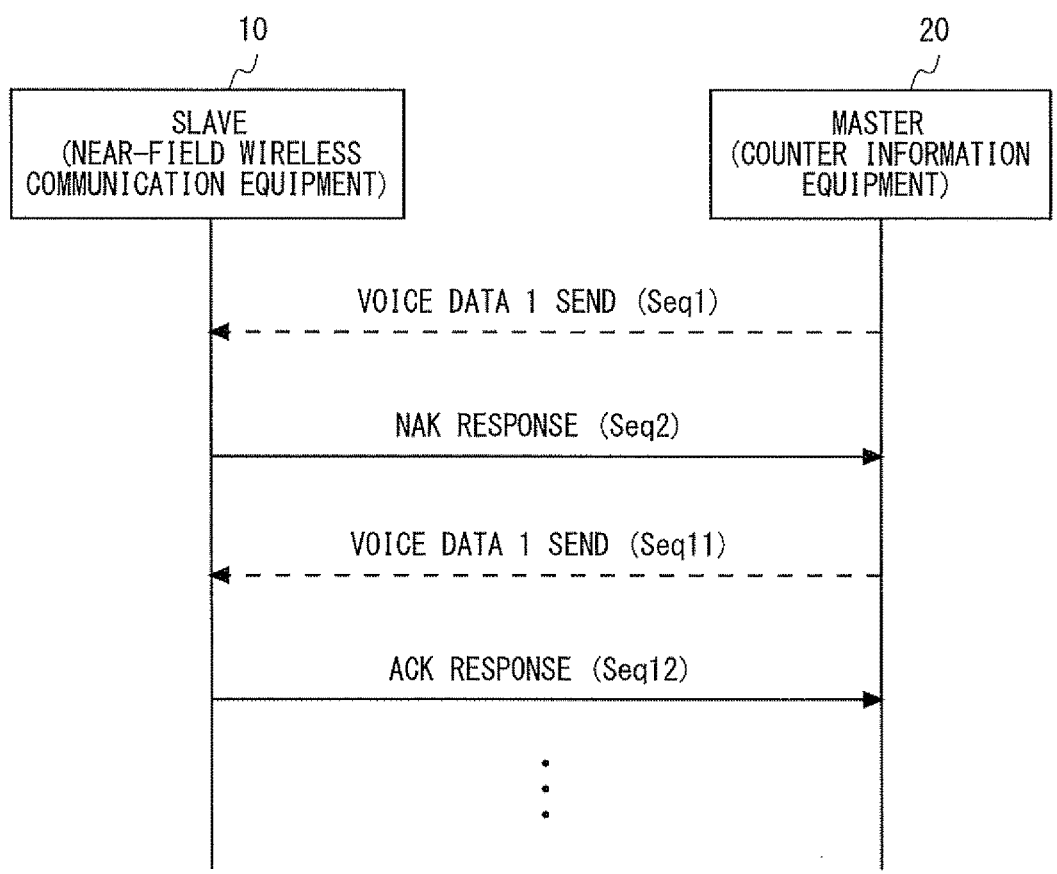
FIG. 5 is a sequence diagram showing one example of a signal sequence when the voice data 1 signal is re-transmitted between the slave-side near-field wireless communication equipment and the master-side counter information equipment shown in FIG. 1.

On the other hand, the CPU 12 receives the voice data 1 signal, successively analyzes the voice data 1 signal, and determines, when the voice data 1 signal has been converted into the original numerical data and the numerical data after the conversion does not satisfy the protocol to be used, that the voice data 1 signal has a failure. At this time, the CPU 12 generates the NAK response indicating that it has not received the normal data and sends back the NAK response to the master-side counter information equipment 20 via the Bluetooth module 11 using the AVRCP profile (sequence Seq2). The master-side counter information equipment 20 that has received the NAK response recognizes that the data transmission to the slave-side near-field wireless communication equipment 10 has failed. Then as shown in FIG. 5, the operation moves to a re-transmission operation in which the same data is re-transmitted to the slave-side near-field wireless communication equipment 10 as the voice data 1 signal for re-transmission (sequence Seq11). In this way, the master-side counter information equipment 20 does not transmit the voice data signal 2 until the time that the CPU 12 confirms that the voice data 1 that has been sent to the slave-side near-field wireless communication equipment 10 from the master-side counter information equipment 20 satisfies the protocol and the master-side counter information equipment 20 receives the ACK signal as a result of the confirmation. According to these procedures, the reliability of the data communication between the master-side counter information equipment 20 and the slave-side near-field wireless communication equipment 10 can be secured. FIG. 5 is a sequence diagram showing one example of the signal sequence when the voice data 1 signal is re-transmitted between the slave-side near-field wireless communication equipment 10 and the master-side counter information equipment 20 shown in FIG. 1.

In the aforementioned embodiment, the operation example in which the data signal that is transmitted in the downlink from the master-side counter information equipment 20 to the slave-side near-field wireless communication equipment 10 by using the A2DP profile and the response signal in accordance with the result of analyzing the data signal is sent back in the uplink to the master-side counter information equipment 20 from the slave-side near-field wireless communication equipment 10 that has received this data signal by using the AVRCP profile has been described. However, the transmission/reception direction of the transmission data signal and the response signal may be opposite to the direction described above.

That is, the data signal may be transmitted in the uplink from the slave-side near-field wireless communication equipment 10 to the master-side counter information equipment 20 by using the A2DP profile and the response signal in accordance with the result of the analysis of the data signal may be sent back in the downlink from the master-side counter information equipment 20 that has received this data signal to the slave-side near-field wireless communication equipment 10 by using the AVRCP profile.

Further, while the case in which the A2DP profile to transmit the data signal is applied in the downlink from the master-side counter information equipment 20 to the slave-side near-field wireless communication equipment 10 and the AVRCP profile to transmit the response signal is applied in the uplink from the slave-side near-field wireless communication equipment 10 to the master-side counter information equipment 20 has been described in the aforementioned embodiment, the present invention is not limited to this case.

That is, any type of profile may be used as long as it is possible to perform bidirectional data communication using different profiles for the downlink and the uplink using, for example, a Handset Profile (HSP profile), a Human Interface Device Profile (HID profile), a Personal Area Networking Profile (PAN profile) and the like and to perform the alternate transmission/reception operations of the transmission data signal and the response signal.

Description of Effects of Embodiment

As described above in detail, in this embodiment, the following effects can be obtained.

In this embodiment, when the master-side counter information equipment 20 is located close to the slave-side near-field wireless communication equipment 10 loaded with a plurality of profiles of the Bluetooth near-field wireless communication system and mutual data communication between them is made possible, the operation of transmitting the transmission data in the downlink from the master-side counter information equipment 20 to the slave-side near-field wireless communication equipment 10 or the uplink from the slave-side near-field wireless communication equipment 10 to the master-side counter information equipment 20, and the operation of sending back, using a profile different from a profile applied to the transmission data, the response data indicating the result of analyzing the transmission data in the uplink from the slave-side near-field wireless communication equipment 10 to the master-side counter information equipment 20 or the downlink from the master-side counter information equipment 20 to the slave-side near-field wireless communication equipment 10 are alternately repeated. Accordingly, the master-side counter information equipment 20 and the slave-side near-field wireless communication equipment 10 mutually monitor the operations of each other, whereby it is possible to definitely secure the reliability and the validity of the data to be transmitted and received.

More specifically, as shown in the block configuration diagram in FIG. 1 and the sequence diagram in FIG. 2, by alternately repeating the operation of transmitting the voice data composed of the DTMF signal (voice band signal) that uses the A2DP profile from the master-side counter information equipment 20 (sequence Seq1) and the operation of transmitting the response data using the AVRCP profile from the slave-side near-field wireless communication equipment 10 (sequence Seq2) or by alternately repeating the operation of transmitting the voice data from the slave-side near-field wireless communication equipment 10 and the operation of transmitting the response data from the master-side counter information equipment 20, it becomes possible to secure the validity and the reliability of the data communication between them using only a typical module loaded with the typical A2DP/AVRCP profiles as the Bluetooth module 11. That is, by simply using the inexpensive Bluetooth module that is widely available on the market as the Bluetooth module 11, it is possible to perform simple data communication that uses the voice band signal (e.g., DTMF signal) and to secure the validity and the reliability of the data communication.

The preferable embodiment of the present invention has been described above. It should be noted, however, that this embodiment is merely an example of the present invention and is not intended to limit the present invention. It will be easily understood for those skilled in the art that various modifications and changes may be made on the present invention according to particular applications without departing from the spirit of the present invention.

While the present invention has been described above with reference to the embodiment, the present invention is not limited to the above description. Various modifications that can be understood by those skilled in the art may be made on the configurations and the details of the present invention.

This application is based upon and claims the benefit of priority from Japanese Patent Application No. 2015-80153, filed on Apr. 9, 2015, the disclosure of which is incorporated herein in its entirety by reference.

INDUSTRIAL APPLICABILITY

The present invention is applicable to wireless communication apparatuses and near-field wireless communication apparatuses.

REFERENCE SIGNS LIST

10 NEAR-FIELD WIRELESS COMMUNICATION EQUIPMENT
11 BLUETOOTH MODULE
12 CPU (CENTRAL PROCESSING UNIT)
20 COUNTER INFORMATION EQUIPMENT
31 A2DP PROFILE
32 AVRCP PROFILE

The invention claimed is:

1. A near-field wireless communication equipment loaded with a plurality of profiles of a Bluetooth near-field wireless communication system, the near-field wireless communication equipment performing,
   in a case in which data communication with a counter information equipment is made possible, one of first operations and second operations, the first operations comprising alternately repeating reception of ones of first transmission data in a first voice-band signal from the counter information equipment and then transmission of respective ones of first response data indicating a result of analyzing respective ones of the first transmission data in the first voice-band signal that has been received to the counter information equipment using a first profile different from a profile that has been applied to the reception of the first transmission data in the first voice-band signal and the second operations comprising alternately repeating transmission of ones of second transmission data in a second voice-band signal to the counter information equipment and then reception of respective ones of second response data indicating a result of analyzing respective ones of the second transmission data in the second voice-band signal from the counter information equipment using a second profile different from a profile that has been applied to the second transmission of the transmission data in the second voice-band signal, wherein:
   the first profile applied to the first transmission data in the first voice-band signal, in a first case in which the first operations are performed, and the second profile applied to the second transmission data in the second voice-band signal, in a second case in which the second operations are performed, is an Advanced Audio Distribution Profile (A2DP profile), and
   the first profile applied to the first response data, in the first case, and the second profile applied to the second response data, in the second case, is an Audio/Video Remote Control Profile (AVRCP profile).

2. The near-field wireless communication equipment according to claim 1, wherein:
the first transmission data in the first voice-band signal, in the first case, and the second transmission data in the second voice-band signal, in the second case, is composed using a Dial Tone Multiplexed Frequency (DTMF) signal composed of a voice band signal, and
the first response data, in the first case, and the second response data, in the second case, is composed using an Acknowledgement (ACK) signal indicating an acknowledgement response or a Negative Acknowledgement (NAK) signal indicating a negative acknowledgement response.

3. The near-field wireless communication equipment according to claim 1, wherein the ones of the first response data, in the first case, and the ones of the second response data, in the second case, is transmitted with the AVRCP profile in response to analysis of the respective ones of the first transmission data, in the first case, and the respective ones of the second transmission data, in the second case, received with the A2DP profile.

4. A near-field wireless communication method using a plurality of profiles of a Bluetooth near-field wireless communication system, the near-field wireless communication method performing,
in a case in which data communication with a counter information equipment is made possible, one of first operations and second operations, the first operations comprising alternately repeating reception of ones of first transmission data in a first voice-band signal from the counter information equipment and then transmission of respective ones of first response data indicating a result of analyzing respective ones of the first transmission data in the first voice-band signal that has been received to the counter information equipment using a first profile different from a profile that has been applied to the reception of the first transmission data in the first voice-band signal and the second operations comprising alternately repeating transmission of ones of second transmission data in a second the voice-band signal to the counter information equipment and then reception of respective ones of second response data indicating a result of analyzing respective ones of the second transmission data in the second voice-band signal from the counter information equipment using a second profile different from a profile that has been applied to the transmission of the second transmission data in the second voice-band signal, wherein:
the first profile applied to the first transmission data in the first voice-band signal, in a first case in which the first operations are performed, and the second profile applied to the second transmission data in the second voice-band signal, in a second case in which the second operations are performed, is an Advanced Audio Distribution Profile (A2DP profile), and
the first profile applied to the first response data, in the first case, and the second profile applied to the second response data, in the second case, is an Audio/Video Remote Control Profile (AVRCP profile).

5. The near-field wireless communication method according to claim 4, wherein:
the first transmission data in the first voice-band signal, in the first case, and the second transmission data in the second voice-band signal, in the second case, is composed using a Dial Tone Multiplexed Frequency (DTMF) signal composed of a voice band signal, and
the first response data, in the first case, and the second response data, in the second case, is composed using an Acknowledgement (ACK) signal indicating an acknowledgement response or a Negative Acknowledgement (NAK) signal indicating a negative acknowledgement response.

* * * * *

UNITED STATES PATENT AND TRADEMARK OFFICE
CERTIFICATE OF CORRECTION

PATENT NO. : 10,015,652 B2
APPLICATION NO. : 15/307425
DATED : July 3, 2018
INVENTOR(S) : Noriyuki Kura Page 1 of 1

It is certified that error appears in the above-identified patent and that said Letters Patent is hereby corrected as shown below:

On the Title Page

Page 2, Column 2, Other Publications, Line 2; After "2016.", insert --¶Communication dated Aug. 9, 2017, from the State Intellectual Property Office of the P.R.C. in counterpart Chinese application no. 201680001163.9--

Signed and Sealed this
Twenty-sixth Day of February, 2019

Andrei Iancu
*Director of the United States Patent and Trademark Office*